W. A. RINGLER.
MEANS FOR CONTROLLING FINANCIAL TRANSACTIONS.
APPLICATION FILED FEB. 7, 1914.

1,232,844.

Patented July 10, 1917.
2 SHEETS—SHEET 1.

W. A. RINGLER.
MEANS FOR CONTROLLING FINANCIAL TRANSACTIONS.
APPLICATION FILED FEB. 7, 1914.

1,232,844.

Patented July 10, 1917.
2 SHEETS—SHEET 2.

UNITED STATES PATENT OFFICE.

WILLIAM A. RINGLER, OF NEW YORK, N. Y., ASSIGNOR TO WASHINGTON STEAMSHIP CORPORATION, OF NEW YORK, N. Y., A CORPORATION OF NEW YORK.

MEANS FOR CONTROLLING FINANCIAL TRANSACTIONS.

1,232,844.  Specification of Letters Patent.  Patented July 10, 1917.

Application filed February 7, 1914. Serial No. 817,139.

*To all whom it may concern:*

Be it known that I, WILLIAM A. RINGLER, a subject of the German Emperor, and resident of New York, county of New York, State of New York, have invented certain new and useful Improvements in Means for Controlling Financial Transactions, of which the following is a specification.

My invention relates to means for controlling transactions such as the selling of foreign drafts and money orders and the like, and the collection of money, and has for its object to provide a simple and effective means for controlling financial transactions of this character and the provision of a simple and effective means for carrying out the method. Many banks, bankers, express companies and steamship companies have appointed agents to transact for their account certain classes of business, primarily the selling of foreign money orders and the like, and in order to be secured against loss, require from such agents a surety bond of a given figure, say $5000.00. As soon as the proper formalities of bonding are accomplished, the express companies deliver to these appointed agents, foreign draft or money order blanks limited in total to the amount of the surety bond. These money order blanks are usually issued in series of $20.00, $50.00 and $100.00 respectively. A system of this kind is defective in that it is not flexible enough as naturally the amount of business which the agent can do is limited by the total number of blanks which he has received. The flexibility of the system is further reduced by reason of the fact that only blanks of the issued denominations, namely, $20.00, $50.00 and $100.00 are available for use by the agent. For example, if the agent sells a money order for $51.00 he is compelled to use a $100.00 blank or if he issues a money order, for instance, for $21.00 he must use a $50.00 blank, while if he sells an order, for instance, for $810.00 he is necessarily compelled to use eight $100.00 blanks and one $20.00 blank, or in other words, in the latter instance, a total of nine blanks. It is obvious that if an agent does a reasonably good money order business a supply of these limited money order blanks totaling for instance, $5000.00 in all, will not last very long so that it very often actually happens that an agent will find himself without suitable blanks when a customer applies for the purchase of a money order. This is also true in the case of foreign drafts with such a system. In order to safeguard the interests of the particular banks, bankers, express or steamship companies, it is, of course, absolutely essential that the business done by the agent be limited to the amount of the bond. The particular purpose of my invention is to overcome these difficulties and to this end I have devised a method and means for carrying out the method which is extremely flexible and which will at all times protect the interests of the bank, banker, express company or steamship company, as the case may be. With this end in view my invention consists in the use of a control stamp comprising two sections, one-half of which in the case, for instance, of a foreign money order is pasted or otherwise secured on the remittance statement and the other half pasted on the receipt which the customer receives, the two halves each being suitably distinguished from the other and being connected in any suitable way so as to be easily separated as, for instance, by means of a line of perforations. My improvement will be fully described hereinafter and the features of novelty pointed out in the appended claims.

In the drawings which illustrate only examples of my idea, Figures 1 and 2 are face views of foreign money order blanks with my improved control stamps in proper position thereon as issued for instance by steamships and express companies.

In Fig. 1 of said drawing 1 represents the remittance statement to which the advice 2 is detachably connected in any suitable manner as by means of a line of perforations 3, the remittance statement 1 and the advice 2 being detachably connected at one edge to the usual stub 4 in any suitable manner as by means of a line of perforations 5. A receipt blank 6 is detachably attached to the remittance statement 1 by means of a line of perforations 7 the usual notification 8 being detachably secured to the receipt blank 6 by means of a line of perforations 9 and to the advice by means of a line of perforations 10, the latter preferably forming a continuation of the line of perforations 7. At the meeting edges of the remittance statement 1 and the receipt blank 6 I provide a series of blank spaces 11 and 12 located respectively on said remittance statement and the receipt blank and registering with each other, in which spaces the control stamps are pasted or otherwise secured. The control stamps comprise the advice control stamp 13 and the receipt control stamp 14 detachably connected together, for instance, by means of perforations 15, the stamps being of a size to fit said spaces 11 and 12 and to bring the perforations 15 into registry with the line of perforations 7 when the stamps are pasted in position upon the money order blank. The two sections or halves of the stamps, comprising the advice control stamp and receipt control stamps are suitably distinguished from each other either by designations, or by different colors or by both, and bear in addition suitable designations indicating the value of each complete stamp. The remittance statement 1 in addition to the usual information contains the warning 16 reading for instance as follows: "This order will only be accepted when sufficiently covered by advice control stamps", while the receipt blank in addition to the usual information contains a specimen 17 of the receipt control stamp 14, together with an explanation 18 and a statement 19 that it is understood and agreed by the person accepting the receipt, that it is good only when bearing receipt control stamps as per specimen of not less than the amount receipted for and that the receipt control stamps must be canceled in some manner for instance in ink or by means of a suitable rubber stamp or by writing the initials of the agent thereon. The stubs 4 which may be secured in a book or form part of a pad in the usual manner, contain in addition to the customary information a series of spaces 20 properly captioned in which a record of the number of control stamps used on the particular money order may be entered.

A person desiring to remit an amount of money to another person for instance, in Hungary, will go to an agent provided with my improved controlling means and instructed in my improved method and ask to have the particular amount of money transmitted. The agent thereupon fills out the stub 4, the remittance statement 1, the advice 2, the receipt 6 and the notification 8 in the proper manner and then pastes or otherwise secures in the spaces 11 and 12 respectively the necessary number of control stamps composed of the sections 13 and 14. The number of control stamps used are also entered in the spaces 20 and must have a designated value aggregating an amount not less than the amount of the order and in case the amount of the order cannot be exactly covered by the stamps must have a value nearest to but not less than the said amount which the said order calls for. These control stamps as before stated are so positioned upon the remittance statement 1 and receipt blank 6 respectively as to bring perforations 15 approximately into registry with the perforations 10. After this has been done the receipt blank 6 and the notification 8 are separated from the remittance statement 1 and advice 2 along the lines of perforations 7, 10 and handed to the purchaser of the money order. The receipt blank 6 bearing the receipt control stamp 14 is retained by said purchaser while the notification 8 is separated therefrom along the perforations 9 and forwarded by the purchaser to the payee to be received by the latter as a notice that the money order has been purchased and forwarded. The remittance statement 1 with the advice control stamp 13 thereon, and the connected advice 2 are then detached from the stub 4 along the perforations 5 and are sent to the bank, banker, steamship or express company with a check to cover the transaction. This company separates the remittance statement 1 from the advice 2 along the perforations 3 and keeps the remittance statement with the advice control stamp 13 thereon for its own file and sends the advice 2 to its European branch where a postal money order corresponding to the amount of the foreign money order is bought and sent to the payee or remittance is made to said payee in foreign bank notes or coin.

As the receipt 6 stipulates that it is good only when bearing receipt stamps not less than the amount receipted for or its equivalent in foreign money, it follows that the agent can legitimately sell money orders only as long as he has control stamps in his possession. If he gives a bond of $5000.00 for security he would get from the bank, banker, express or steamship company $5000.00 worth of these stamps of various denominations while if he gives a larger or smaller amount as security the stamps which he would receive would, of course, be for a proportionate amount. In any case he can sell only money orders aggregating in amount, the amount of his bond. Even if the agent should attempt to make out the receipt for one amount and the remittance statement for a smaller amount or even if he did not send the remittance statement and advice to the express or steamship company at all, the company would still be protected to the extent of the bond because the agent would have to paste the necessary receipt control stamps on the receipt blank in order to avoid arousing the suspicions of the customer who would receive a warning from the statement 19 on the receipt blank 6. Thus if this proceeding should be attempted, the agent after he has used up all the receipt control stamps would still have the corresponding control advice stamps left, but would be unable to use them on receipts, for the reason that the advice control stamps contain different wording usually arranged in a conspicuously different manner from that of the receipt control stamps, or as before stated both halves of each stamp may even be of different colors or otherwise conspicuously distinguished. The stamps placed on the remittance statement will at all times give the bank, banker, express or steamship company a control of the agent's business, a record of the number of stamps used by him being kept by the company. After the agent's supply of the control stamps has become exhausted or depleted, a new supply of stamps would be sent to him to again bring the amount of the control stamps up to the amount he is entitled to under his bond.

In the form shown in Fig. 2, the receipt blank $6^a$ in addition to containing the customary matter is provided with a series of blank spaces $12^a$ in which receipt control stamps $14^a$ are adapted to be pasted or otherwise secured. The said stamps $14^a$ which correspond in function to the stamps 14 of Fig. 1 in addition to bearing designations such as figures to indicate the denomination, are also of different colors for each denominational value. The receipt blank $6^a$ also has produced thereon a specimen stamp as indicated at $17^a$ and an explanation $18^a$ reciting the different colors of the stamps together with the intended value thereof. A statement $19^a$ substantially similar to the statement 19 of the form shown in Fig. 1 is also preferably incorporated in the blank $6^a$. The form at present being described further comprises a remittance statement $1^a$ corresponding in function to the remittance statement 1 of Fig. 1 and containing spaces $20^a$ corresponding to the spaces 20 and similarly captioned and in which the number of control stamps of the various values which have been used in the particular transactions may be entered. As shown in Fig. 2 the remittance statement $1^a$ and the receipt blank $6^a$ are separated by a plurality of columns of figures 21 reading downwardly from right to left and beginning for instance with $10. at the top of the extreme right hand column and increasing for instance by tens and ending for instance with $1000. at the bottom of the extreme left hand column. If desired a blank sheet 22 may be located beneath each combined remittance statement and receipt blank with a carbon sheet located therebetween, so that as the remittance statement $1^a$ and receipt blank $6^a$ are filled in, a duplicate of the entries will appear on the blank sheet 22, the latter being retained by the branch agent.

In using the present type of money order the receipt blank $6^a$ and remittance statement $1^a$ are properly filled in. Assuming the order is for $389.00 as in the example, the required number of receipt control stamps $14^a$ totaling a figure nearest to but not less than the amount in question are pasted or otherwise secured in the spaces $12^a$. Thus in the illustration two $10., one $20. one $50. and three $100 stamps have been used, the same totaling $390.00. An entry of the number of different stamps used is also made in the spaces $20^a$. The completed receipt $6^a$ is now separated from the remittance statement $1^a$ by tearing or cutting along a transverse line $21^a$ which in the present instance extends between the second and third columns of figures 21 down to the designation $390., then cutting or tearing along a line $21^b$ between the designations $390. and $400. and continuing along a line $21^c$ between the first and second columns 21 from the right to completely separate the receipt blank from the remittance statement. The total amount of the control stamps $14^a$ thus corresponds with the amount designated by the figures adjacent to the line $21^b$ in the present case $390., this amount being not less than the amount called for by the order. At the same time the first figure on the remittance statement, in the present case $400. will indicate that the next preceding figure which has been torn off, namely $390. is an amount approximately at least the amount of the order and in any case being not less than said amount.

With this arrangement it will be seen that the stamps and figures coöperate to protect the purchaser of the money order and at the same time serve to check up for the bank, banker, express company or steamship company, the money orders sold by the particular agent. With this latter form of my improvement any sort of advice and notification may be used and the blanks as in the first instance may be provided either in book or pad form.

My improved method is equally well adapted for use in many other instances where a control on the amount of business is necessary or advisable. For example, in the case of foreign drafts, a foreign banking house may give a local bank the privilege of drawing for their account on one of their correspondents abroad to the extent of $5000.00. Under old systems of supplying draft blanks these were also limited to a certain amount aggregating the amount in question, in which case the same difficulties arise regarding the business limitations, as in the case of limited money orders as now issued by banks, bankers, express or steamship companies to their agents. In the case of foreign drafts when using my control stamps that part of said stamp which is to be pasted on the draft would be designated draft control stamps, while that portion of the control stamp adapted to be secured to the remittance statement might be designated as in the present illustration. It will readily be seen that when thus used the banker cannot legitimately issue more drafts than the number of stamps which he has on hand.

My improved method might further be used in connection with the collection of money by collectors who are usually bonded. For instance if such a collector is bonded for $2000.00 he would receive $2000.00 worth of stamps and could not collect money in excess of such amount, it being understood that the receipts which he hands to the persons from whom he collects money stipulate that they are not good unless control stamps of a value not less than the amount receipted for are attached thereto. The receipts in such case would also contain a statement or notification similar to the statements 19 or 19ª to warn the person paying out the money not to accept a receipt unless the required control stamps are attached. In this instance the collector would attach the control stamps so that one part thereof would be secured to the receipt he gives for the money collected while the other part would be attached to the stub which remains in his collection book, and serves as a means for checking up his collections over any given period of time.

My invention thus provides a medium for controlling financial transactions of the kind indicated which is much more flexible than any at present employed and also reduces the number of blanks necessary for use in completing such transactions, to a minimum. At the same time an absolute and effective check or control is maintained by the home office whatever it may be, on all who act as its agents in transacting financial business.

Various changes in the specific construction shown and described may be made within the scope of the claims without departing from the spirit of my invention.

I claim:

1. In instruments of the kind described, the combination of a receipt form, a memorandum sheet with which said receipt form is detachably connected, a stamp or stamps fixed to said receipt form and having an indicated value approximating and not less than the amount of the transaction and a stamp or stamps fixed to said memorandum sheet and having an indicated value corresponding to that of the first mentioned stamp or stamps whereby the amount of the transaction is checked up.

2. In instruments of the kind described, the combination of a receipt form, a remittance statement sheet with which said receipt form is detachably connected, an advice form detachably connected with said remittance statement sheet, advice control stamp or stamps adapted to be secured upon said statement in such numbers as to have an indicated value approximating and not less than the amount of the transaction and receipt control stamp or stamps adapted to be secured to said receipt form in such numbers as to have an indicated value corresponding to the value of said advice control stamp or stamps and coöperating with said advice control stamp or stamps to check up the transaction.

3. In instruments of the kind described, the combination of a receipt form, a remittance statement sheet with which said receipt form is detachably connected, an advice form detachably connected with said remittance statement sheet, advice control stamp or stamps adapted to be secured upon said statement in such numbers as to have an indicated value approximating and not less than the amount of the transaction, the said stamp or stamps checking the transaction.

In testimony whereof I have hereunto set my hand in the presence of two subscribing witnesses.

WILLIAM A. RINGLER.

Witnesses:
  JOHN A. KEHLENBECK,
  FRED A. KLEIN.

Copies of this patent may be obtained for five cents each, by addressing the "Commissioner of Patents, Washington, D. C."